(12) United States Patent
Ljung et al.

(10) Patent No.: US 12,317,168 B2
(45) Date of Patent: May 27, 2025

(54) METHODS FOR ENABLING CONTROLLED COMMUNICATION OF NON-REAL TIME DATA, RELATED WIRELESS DEVICES, AND RELATED RADIO NETWORK NODES

(71) Applicant: Sony Group Corporation, Tokyo (JP)

(72) Inventors: Rickard Ljung, Helsingborg (SE); Anders Isberg, Lund (SE)

(73) Assignee: Sony Group Corporation, Tokyo (JP)

( * ) Notice: Subject to any disclaimer, the term of this patent is extended or adjusted under 35 U.S.C. 154(b) by 193 days.

(21) Appl. No.: 17/433,564

(22) PCT Filed: Feb. 7, 2020

(86) PCT No.: PCT/SE2020/050120
§ 371 (c)(1),
(2) Date: Aug. 24, 2021

(87) PCT Pub. No.: WO2020/185136
PCT Pub. Date: Sep. 17, 2020

(65) Prior Publication Data
US 2022/0159547 A1 May 19, 2022

(30) Foreign Application Priority Data
Mar. 8, 2019 (SE) .................... 1950295-4

(51) Int. Cl.
*H04W 4/70* (2018.01)
*H04W 40/24* (2009.01)
(Continued)

(52) U.S. Cl.
CPC .................. *H04W 40/24* (2013.01)

(58) Field of Classification Search
None
See application file for complete search history.

(56) References Cited

U.S. PATENT DOCUMENTS 10,051,507 B2 *  8/2018  Hsu .................... H04L 47/32
10,212,726 B2 *  2/2019  Baek ................ H04W 72/1268
(Continued)

FOREIGN PATENT DOCUMENTS

CN    1205604 A    1/1999
CN    1658614 A    8/2005
(Continued)

OTHER PUBLICATIONS

Swedish Search Report from corresponding Swedish Application No. 1950295-4, Oct. 3, 2019, 2 pages.
(Continued)

*Primary Examiner* — Sithu Ko
(74) *Attorney, Agent, or Firm* — Tucker Ellis LLP

(57) ABSTRACT

The present disclosure provides a method, performed in a wireless device, for enabling controlled communication of non-real time data while the wireless device is registered with a radio network node for communicating real-time data. The method comprises receiving a network data indicator indicative of one or more suitable data transfer occasions to communicate the non-real time data over the radio network node. The method comprises determining based on the network data indicator whether any non-real time data is to be communicated in the one or more data transfer occasions. The method comprises, upon determining that non-real time data is to be communicated, communicating non-real time data over the radio network node to an external node at the one or more data transfer occasions.

24 Claims, 9 Drawing Sheets

(51) Int. Cl.
*H04W 56/00* (2009.01)
*H04W 72/12* (2023.01)

(56) References Cited

U.S. PATENT DOCUMENTS

| | | | | |
|---|---|---|---|---|
| 10,412,624 | B2* | 9/2019 | Laha | H04L 41/0893 |
| 10,420,065 | B2* | 9/2019 | Gupta | H04L 65/1069 |
| 10,524,189 | B2* | 12/2019 | Hong | H04W 76/27 |
| 10,687,268 | B2* | 6/2020 | Wong | H04W 48/06 |
| 10,779,343 | B2* | 9/2020 | Wei | H04W 76/14 |
| 11,882,524 | B2* | 1/2024 | Hasholzner | H04W 52/028 |
| 2002/0103922 | A1 | 8/2002 | Arend | |
| 2002/0105906 | A1 | 8/2002 | Marjelund | |
| 2003/0045273 | A1 | 3/2003 | Pyhalammi | |
| 2010/0322124 | A1 | 12/2010 | Luoma | |
| 2012/0044828 | A1 | 2/2012 | Seo | |
| 2012/0281531 | A1* | 11/2012 | Susitaival | H04W 74/0875 370/230 |
| 2014/0079046 | A1 | 3/2014 | Yang | |
| 2014/0369296 | A1 | 12/2014 | Breuer | |
| 2015/0156793 | A1* | 6/2015 | Dai | H04W 72/543 370/329 |
| 2018/0324636 | A1* | 11/2018 | Laha | H04L 41/0894 |
| 2019/0028960 | A1* | 1/2019 | Wong | H04B 17/327 |
| 2019/0174395 | A1* | 6/2019 | Choe | H04W 72/56 |
| 2019/0306764 | A1* | 10/2019 | da Silva | H04W 12/106 |
| 2019/0320485 | A1* | 10/2019 | Kim | H04W 76/25 |
| 2021/0127343 | A1* | 4/2021 | Mladin | H04W 76/14 |

FOREIGN PATENT DOCUMENTS

| | | | |
|---|---|---|---|
| CN | 101547517 | A | 9/2009 |
| CN | 101730242 | A | 6/2010 |
| CN | 102802171 | A | 11/2012 |
| CN | 102905315 | A | 1/2013 |
| CN | 108141882 | A | 6/2018 |
| EP | 0841763 | A1 | 5/1998 |
| JP | 2008177846 | A | 7/2008 |
| JP | 2008245283 | A | 10/2008 |
| JP | 2008277992 | A | 11/2008 |
| JP | 2012191663 | A | 10/2012 |
| JP | 2013009095 | A | 1/2013 |
| JP | 2015082792 | A | 4/2015 |
| JP | 2015228575 | A | 12/2015 |
| KR | 20050118599 | A | 12/2005 |
| KR | 100826914 | B1 | 5/2008 |
| KR | 20100118450 | A | 11/2010 |
| KR | 20110060065 | A | 6/2011 |
| KR | 20150060362 | A | 6/2015 |
| KR | 20180014694 | A | 2/2018 |
| WO | 2011099911 | A1 | 8/2011 |
| WO | WO-2013133212 | A1 | 9/2013 |
| WO | 2013165284 | A1 | 11/2013 |
| WO | WO-2017220248 | A1* | 12/2017 ............ H04W 28/10 |
| WO | 2018095507 | A1 | 5/2018 |
| WO | WO-2018088630 | A1 | 5/2018 |
| WO | WO-2018231918 | A1 | 12/2018 |

OTHER PUBLICATIONS

International Search Report and Written Opinion from corresponding International Application No. PCT/SE2020/050120, May 4, 2020, 14 pages.

* cited by examiner

METHODS FOR ENABLING CONTROLLED COMMUNICATION OF NON-REAL TIME DATA, RELATED WIRELESS DEVICES, AND RELATED RADIO NETWORK NODES

The present disclosure pertains to the field of wireless communications. More specifically, the present disclosure relates to methods for enabling controlled communication of non-real time data, related wireless devices, and related radio network nodes.

BACKGROUND

A large number of Internet-of-Things (IoT) devices are envisioned to be connected via cellular connections in the future. IoT devices may perform varying types of communications. Certain types of IoT services may be based on regular but not frequent transmissions of large amounts of downlink or uplink data. Example use cases include a cellular connected data backup service, a surveillance video camera, a cellular connected storage device or any type of cellular connected device which sometimes needs to download a new firmware update or similar from an external node, e.g. a server. Such type of traffic is, in this disclosure, denoted as non-real time data traffic, while other types of traffic still communicated e.g. in an IoT device that may typically be of smaller size and/or more frequent in their transmission repetitions, are denoted as real time data traffic in the present disclosure.

The cellular connections are not optimally designed for supporting such a combination of real time and non-real time traffic from the IoT device. For example, from a network perspective, a combination of a large number of connected devices, the combination of real time and non-real time data traffic, and the typical variations of traffic load over time create a problematic situation when e.g. several of the above mentioned device connections require large data size transfers during the most busy hour of the day.

As other traffic, such as voice calls, video calls and other services with high Quality of Service levels are given priority in the network nodes over the type of traffic from the above mentioned device types, the network nodes are likely to reject data connections and to limit connections during certain times of the day. However, this imposes restrictions and limitations to the usage of the network. For example, restrictions applied in a network during busy hour occasions may result in the IoT devices not being able to even transmit or receive the data status update messages.

SUMMARY

Accordingly, there is a need for wireless devices, radio network nodes and methods for enabling controlled communication of non-real time data as denoted herein, which mitigates, alleviates or addresses the shortcomings existing and provides a suitable time and/or resource for the non-real time data communication to and/or from the wireless device.

The present disclosure provides a method, performed in a wireless device, for enabling controlled communication of non-real time data while the wireless device is registered with a radio network node for communicating real-time data. The method comprises receiving a network data indicator indicative of one or more data transfer occasions to communicate the non-real time data over the radio network node. The method comprises determining based on the network data indicator whether any non-real time data is to be communicated in the one or more transfer data occasions. The method comprises, upon determining that non-real time data is to be communicated, communicating non-real time data over the radio network node to an external node at the one or more data transfer occasions.

The present disclosure provides a method performed in a radio network node, for supporting communication of non-real time data with a wireless device while the wireless device is registered to the radio network node for communicating real-time data. The method comprises determining one or more data transfer occasions for communication of any non-real time data. The method comprises transmitting a network data indicator indicating the determined one or more data transfer occasions. The method optionally comprises communicating to and/or from the wireless device the non-real time data at the one or more data transfer occasions.

Further, a wireless device is provided, the wireless device comprising: a memory module, a processor module, and a wireless interface, wherein the wireless device is configured to perform any of the methods disclosed herein.

Finally, a radio network node is provided, the radio network node comprising: a memory module, a processor module, and a wireless interface, wherein the radio network node is configured to perform any of the methods disclosed herein.

It is an advantage of the present disclosure that the radio network node is capable of signalling to the wireless device a suitable occasion for communication of any non-real time data that may be available at the wireless device or at the external node. The disclosed radio network node can perform load balancing for non-real time data via the disclosed control mechanism when the radio network node determines suitable occasions for non-real time data to be communicated. This may further enable an improved fleet management of IoT devices, such as for firmware updates, for raw data collection, and/or for battery life optimization of the IoT devices.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
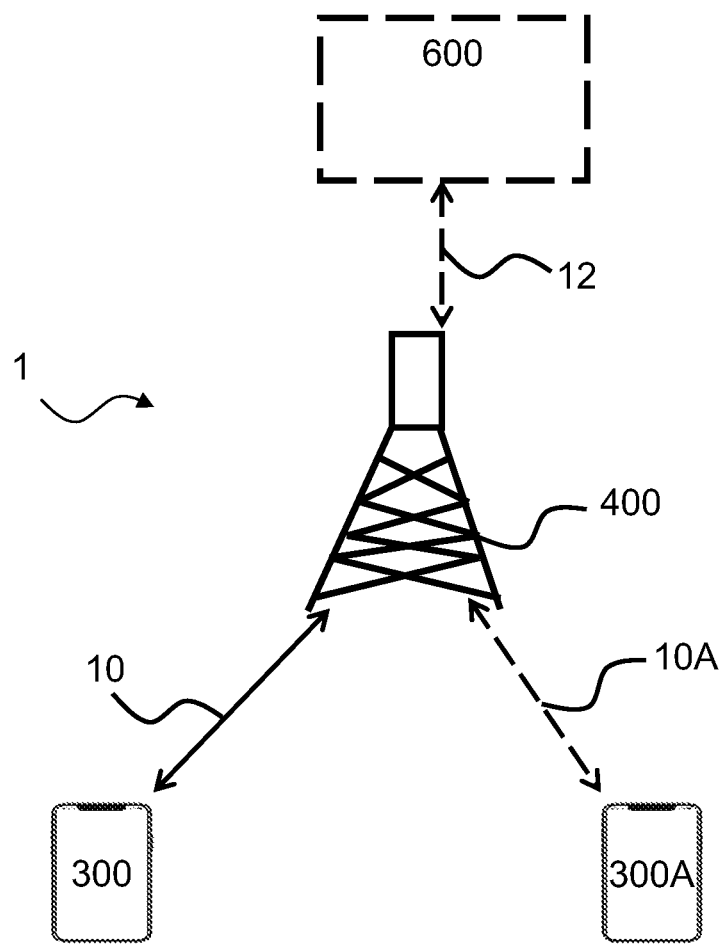
FIG. 1A is a diagram illustrating an exemplary system comprising an exemplary wireless communication system according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A large number of Internet-of-Things (IoT) devices are envisioned to be connected via cellular connections in the future. IoT devices may be perform varying types of communications ranging from real time data communications to non-real time data communications and any combination thereof. Examples use cases include a cellular connected data backup service, a surveillance video camera, a cellular connected storage device or any type of cellular connected device which sometimes needs to download a new firmware update or similar from an external node, e.g. a server.

Typically, the wireless device may transmit and/or receive real time data, e.g. intermittent status reports with small amount of data, with a first connection periodicity (e.g. 10 minutes). In addition, the wireless device may transmit and/or receive non-real time data with a second connection periodicity (e.g. 1 week, 1 month or so) larger than the first connection periodicity and with data that is larger than the real time data. For example, depending on the application run by the wireless device, this could involve that the wireless device for example transmits or receives a status update every hour (e.g. forming real time data) and further once per day or once per week the wireless device in addition wishes to transmit and/or receive a larger size (e.g. couple of GB) data (e.g. forming non-real time data) to/from a cloud storage or similar. It is to be noted that although the term "real time" and "non-real time" are used herein, these two data types may still both be coupled to a background/ unattended traffic e.g. in an IoT device where the connection delay times are same or similar. For example, there may be same expectations on a connection setup delay for the two types of data. However, since there could be specific transmissions where the network would benefit of having additional control of when the communication occurs, such communications of "additional data" are herein referred to as non-real time data communications. Non-real time data communications may comprise data where the amount of data (the data size in bytes) differ between the data denoted as real time data, and/or when the periodicity in between the non-real time data communications differs from the real time data communication, or similar. A difference between real time data and non-real time data may for example be related to the difference in the communication periodicity between the two data types, while their QoS level or similar network specific traffic class are the same. For example, the difference between real time data and non-real time data may be related to a difference in expected amount of data to be communicated (transmitted and/or received).

For example, real time data may have a first property (e.g. first data size, and/or first periodicity). For example, non-real time data may have a second property (e.g. second data size, and/or second periodicity), wherein the second property is different from the first property. A property may be seen as a feature characterizing the data or the data transmission. For example, the second data size is larger than the first data size. For example, the second periodicity is larger than the first periodicity.

As certain time critical traffic may be given priority at the radio network nodes over other traffic, the radio network nodes are likely to appreciate if non-real time data connections could be performed during certain times of the day, e.g. based on network load conditions. In one extreme case, for example, the radio network node may reject traffic from certain devices when network load is very high. Cell-baring specific for IoT enables radio network nodes to reject a data connection and to limit connections during certain times of the day.

However, using the cell-barring functionality imposes restrictions and limitations to the usage of the network. This for example may lead to the wireless devices not being able to even transmit or receive the data status update messages during busy hours.

More specifically, network congestion control functionalities available in $3^{rd}$ Generation Partnership Project (3GPP) systems include e.g. extended access barring (EAB) which allows a radio network node to send a system information indication that blocks one or more access classes of wireless devices or user equipments (UEs) from attempting to access the network. However, this leads to blocking of the wireless device from connecting to the network independently of the intended data communication size, which is not advantageous. For example, in the present disclosure, "small" data from an IoT device are considered as real time data, the inventors have found that it is beneficial to allow non-real time communications (e.g. large data communication with a wireless device) without barring/blocking the communication for the wireless device.

The present disclosure provides, in one or more embodiments, a functionality or capability at the radio network node which provides an indication of suitable connection occasions for non-real time data transfer from and/or to the wireless device. For example, the radio network node disclosed herein is capable of notifying the wireless devices in a cell that the radio network node is prepared to handle relatively larger amount of data traffic in addition to potential smaller amount of data traffic that may be communicated. The disclosed technique can be advantageously used for a large amount of non-real time data in the UE buffer for uplink data transfer, and/or for a large amount of downlink data to be transmitted in the downlink direction.

The figures are schematic and simplified for clarity, and they merely show details which are essential to the understanding of the invention, while other details have been left out. Throughout, the same reference numerals are used for identical or corresponding parts.

FIG. 1A is a diagram illustrating an exemplary system comprising an exemplary wireless communication system 1. The wireless communication system 1 comprises an exemplary radio network node 400 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device 300 and/or a radio network node 400.

A radio network node disclosed herein refers to a radio access network node operating in the radio access network, such as a base station, an evolved Node B, eNB, gNB.

The wireless communication system 1 described herein may comprise one or more wireless devices 300, 300A, and/or one or more radio network nodes 400, such as one or more of: a base station, an eNB, a gNB and/or an access point.

A wireless device may refer to as a mobile device and/or a user equipment, UE. A wireless device may comprise an IoT device.

The wireless device 300, 300A may be configured to communicate with the radio network node 400 via a wireless link (or radio access link) 10, 10A.

The wireless device 300, 300A may be configured to communicate with an external node 600 (e.g. a server device) via the wireless communication system 1, e.g. via the radio network node 400 and over communication link 12. The communication link 12 between the radio network node 400 and the external node 600 comprises a wired communication link and/or a wireless communication link.

The wireless device or UE 300 may comprise one or more sensors for activity detection. The one or more sensors may comprise an accelerometer, a gyroscope, a magnetometer and/or a GPS for providing GPS values. A stream of sensor values may follow two processing routes: 1) a first processing route for local processing where the stream of sensor values is fed into e.g. a model for inference to detect the activity. The model is typically trained using Machine learning/Deep learning (ML/DL) training of historical data. The output from the model is the detected activity, e.g. walking/running. The identified activity is typically represented by a small amount of data. Changes in the detected activity are typically to be reported to the external device 600 as soon as possible; 2) a second processing route for remote processing, where raw sensor data is stored in the wireless device 300 for batch uploading at a later point in time. The raw data is for example used to train and improve the models. There is no time requirement or constraints on such raw data communication. The raw sensor data is large and should typically be transferred when the network load is lower, for example during nights. For example, the UE 300 sends in real time (RT) data the changes in the detected activity while the non-real time (NRT) data may convey raw sensor data.

The wireless device or UE 300 may be configured to operate using a firmware. The firmware, machine learning models or other large resources may be updated over the air interface. Availability of a new firmware is typically announced from the external node 600 (e.g. the server side) whilst the wireless device 300 starts the download of the actual firmware. For example, since the wireless device 300 is aware that that these procedures require large amount of data in the downlink, upon detection of the available of a new firmware (e.g. firmware package) the wireless device can be configured to perform the method disclosed herein to get a network data indicator indicating when it is feasible to start the download. The network data indicator can be used to enable the radio network node 400 to control the data transfer occasion for a wireless device to initiate a large data to upload, and/or a large data download.

Figure 1B:
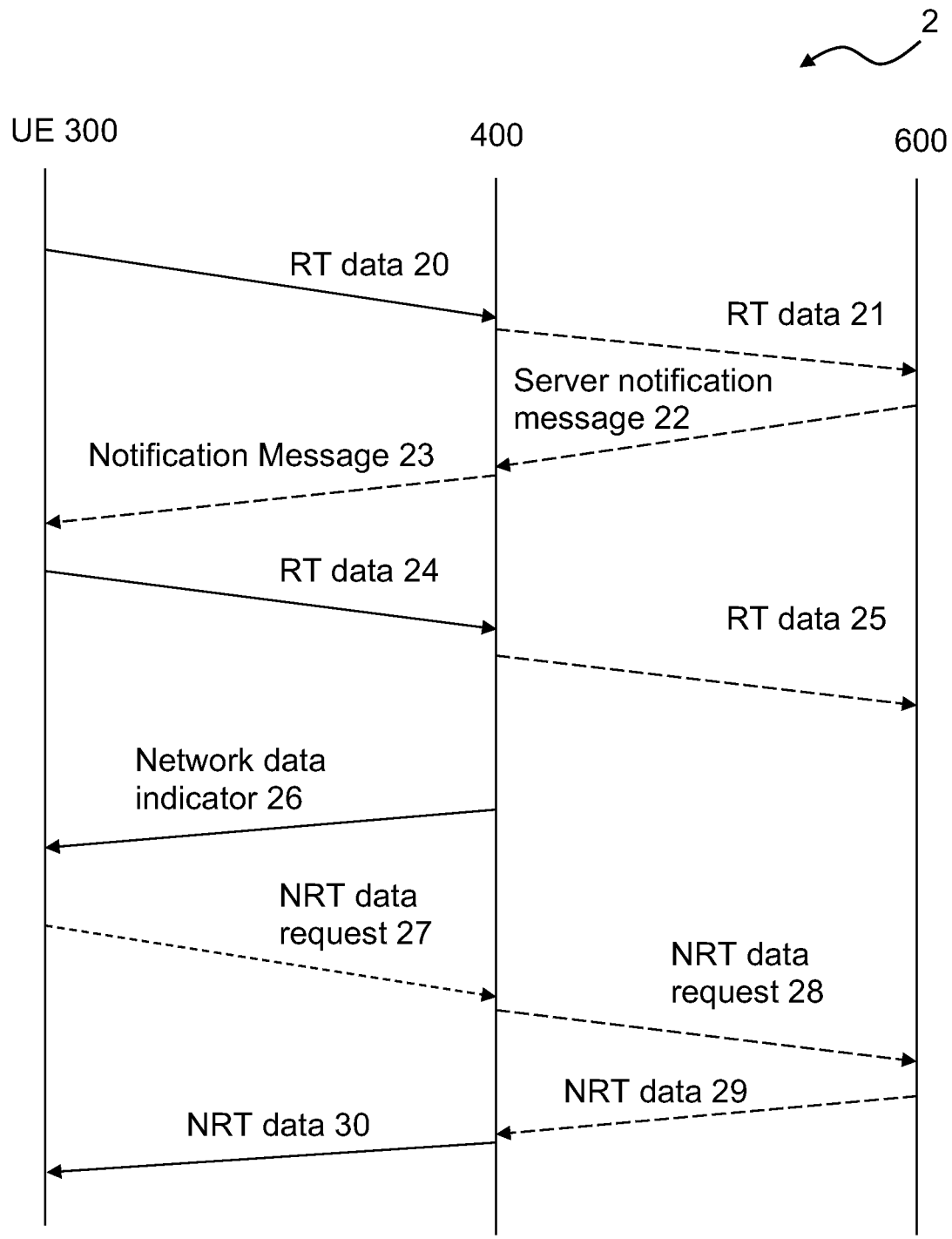
FIG. 1B is a signalling diagram between an exemplary wireless device and an exemplary radio network node according to an exemplary scenario of this disclosure.

FIG. 1B is a signalling diagram 2 between an exemplary wireless device 300 and an exemplary radio network node 400 according to an example scenario of this disclosure.

The wireless device or UE 300 is configured to transmit real time (RT) data 20, 24 in uplink (UL) to an external node 600 via the radio network node 400, which relays the RT data 21, 25 to the external node 600. For example, the RT data may comprise intermittent status reports with small amount of data with a first connection periodicity (e.g. 10 minutes). In addition, UE 300 may be configured to receive in downlink (DL) a Notification message 23 indicating to the UE 300 that non-real time data is to be expected for the UE 300. The Notification message 300 may be triggered by the radio network node 400 receiving a server notification message 22 (e.g. a firmware update notification) from an external node 600. The Notification message 23 may for example indicate that a new firmware is available for the UE 300. The Notification message 23 is typically an application-layer message.

The radio network node 400 determines one or more data transfer occasions for communication of any non-real time data (e.g. the new firmware) and transmits a network data indicator 26 indicating the determined one or more data transfer occasions to the UE 300. The radio network node 400 determines one or more data transfer occasions for communication of any non-real time (NRT) data based on e.g. the server notification message 22 indicative of a size of the NRT data, and e.g. based on the network conditions to satisfy load balancing.

The UE 300 may transmit in UL a non-real time NRT data request 27, 28 to the external node 600 via the radio network node 400. The external node 600 may revert with the NRT data 29 (e.g. the new firmware) to the radio network node 400, The radio network node 400 transmits the NRT data 30 (e.g. the new firmware) in DL to the UE 300 at the determined one or more data transfer occasions indicated in the network data indicator. As the NRT data is not real-time critical, and the UE 300 can therefore wait until there is a suitable network load condition to obtain the NRT data 30 from the radio network node 400 to the UE 300.

The network data indicator disclosed herein allows to indicate the suitable occasion for the communication of any NRT data (e.g. the new firmware in this example).

Figure 2:
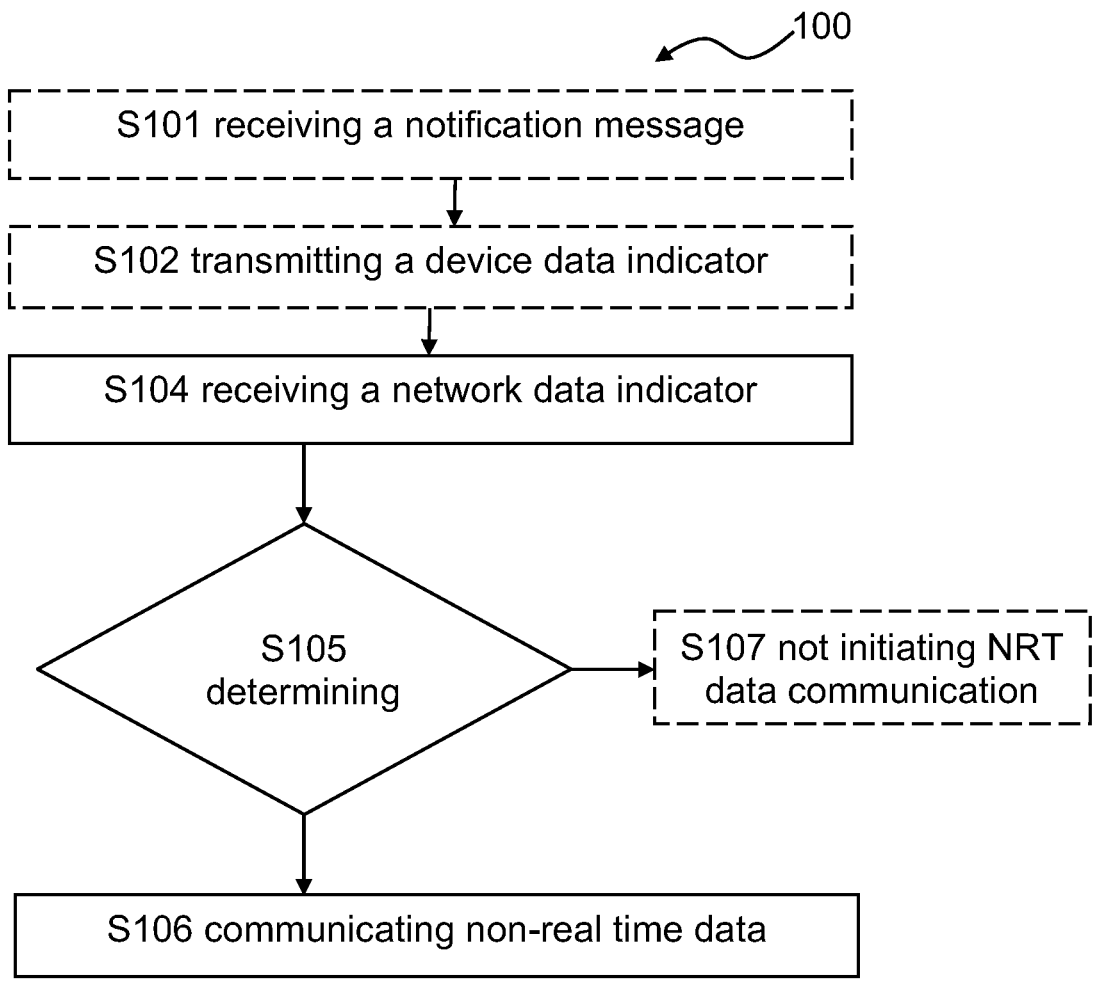
FIG. 2 is a flow-chart illustrating an exemplary method, performed in a wireless device, for enabling controlled communication of non-real time data according to this disclosure.

FIG. 2 shows a flow diagram of an exemplary method 100 performed in a wireless device (e.g. the wireless device disclosed herein, e.g. wireless device 300) according to the disclosure.

The method 100 is performed in a wireless device, for enabling controlled communication of non-real time data while the wireless device is registered with a radio network node for communicating real-time data. For example, the wireless device is registered when the wireless device is camping on a cell of the radio network node, inactive, and/or idle. The wireless device may be configured to communicate with an external node (e.g. external node 600 of any of FIGS. 1A, 1B, 6, 7A-B device) via the wireless communication system 1, e.g. via the radio network node The method 100 comprises receiving S104 a network data indicator indicative of one or more data transfer occasions to communicate the non-real time data over the radio network node. In one or more example methods, the one or more data transfer occasions comprise one or more suitable times and/or resources for communicating the non-real time data. In one or more example methods, one or more suitable time and/or resources for communicating the non-real time data may for example be based on load balancing at the radio network node, e.g. based on a suitable network load condition to transfer the data. A data transfer occasion may comprise a data transfer resource allocation.

The method 100 comprises determining S105 based on the network data indicator whether any non-real time data is to be communicated at the one or more data transfer occasions. In other words, determining S105 based on the network data indicator whether any non-real time data is to be communicated at the one or more data transfer occasions comprises determining whether any NRT data is available for communication. For example, the wireless device may have NRT data in its transmit buffer or may have been informed that the external server has NRT data to transmit to the wireless device. For example, the network indicator may be received in a broadcast message by the wireless device which then needs to determine whether any non-real time data is to be communicated at the one or more data transfer occasions (e.g. received from the radio network node) e.g. based on an indication from the application of the wireless device which expects NRT data to be communicated.

The method 100 comprises, upon determining that non-real time data is to be communicated, communicating S106 non-real time data over the radio network node to an external node at the one or more data transfer occasions. In other words, when there is NRT data on queue to be communicated, the wireless device may trigger communication of the NRT data at the one or more data transfer occasions indicated by the network data indicator. Communicating S106 the non-real time data over the radio network node to an external node at the one or more data transfer occasions may comprise transmitting uplink non-real time data over the radio network node to the external node. Communicating S106 the non-real time data over the radio network node to an external node at the one or more data transfer occasions may comprise receiving downlink non-real time data, e.g. after the wireless device initiating a connection (using RACH) and has entered into RRC connected mode.

In one or more example methods, the method 100 comprises not initiating S107 communication of real time data when it is determined that no communication of non-real time data is to be performed at the one or more data transfer occasions. For example, the wireless device may decide not to use the one or more data transfer occasions indicated in the network data indicator e.g. because the application of the wireless device does not require or expect any NRT data.

In one or more example methods, the non-real time data is of a size larger than the real-time data. In one or more example methods, the real time data is repetitively or continually communicated between the wireless device and to the external device, over the radio network node. In one or more example methods, the real time data may for example be periodically communicated while the non-real time data may not be periodically communicated.

In one or more example methods, the network data indicator is included in a broadcasted message, or a dedicated message. When the network data indicator is included in a dedicated message (e.g. a dedicated signal), the network data indicator may be received while the wireless device is in connected mode (e.g. RRC_Connected mode (where RRC stands for Radio Resource Control)). In one or more embodiments, the network data indicator may be signalled to the wireless device at any of occasions assigned to real time data (e.g. real time data of a size smaller than the NRT data). It may be appreciated that the radio network node can control the occasions of large data transfers with granularity, since the control may be conducted on a UE specific level.

When the network data indicator is included in a broadcasted message, the radio network node may broadcast the network data indicator e.g. in a system information, e.g. a system information block (SIB). This enables one or more wireless devices 300 in idle mode to be aware of the network recommendation of suitable time for large data transfers, since the wireless devices in idle mode are required to monitor the system information.

It is to be noted that the radio network node may not be specifically aware of whether the one or more wireless devices receiving the network data indicator are prepared and/or waiting for an opportunity to communicate large data, or whether there is a large number of UEs listening for this network data indicator. Hence, a broadcasted message comprising the network data indicator (e.g. a broadcasted signal) may result in large number of wireless devices paging the network for the NRT data communication. The wireless device may be configured to applying a random delay value before attempting to access the network.

In one or more example methods, the network data indicator is included in a paging message, or in a wake up signal. In one or more example methods, the network data indicator is included in a paging message e.g. in a system information block, SIB, of the paging message or a specific wake up signal for wireless devices expecting a large data transfer.

A wake up signal may comprise a signal used by the radio network node to indicate an upcoming paging, wherein the wake up signal may be constructed to be received with less receiver complexity compared to the other control signalling in the network. The lower complexity may relate to a smaller bandwidth, a lower requirement on time and/or frequency synchronization, a less complex demodulation, a less complex or absence of required decoding etc. The wake up signal can be constructed as a separate sequence, different from the Release 15 wake up signal which is indicating an ordinary upcoming paging message to the wireless device or UE. The wireless device can listen for the specific wake up signal disclosed herein and receive the wake up signal from the radio network node, which indicates to the wireless device that the network status is suitable for the NRT (and possibly large) data communication. It may be noted that in legacy 3GPP specifications a system information change is notified to idle wireless devices via paging and paging information can be indicated via wake up signal in 3GPP Release 15 and onwards. For example, the disclosed method allows to indicate the suitable time for large data. A system information change indicator can be to configure the wireless device for wake up signalling reception. A wireless device which is prepared to connect to the network for a potential large data transfer may listen for the disclosed wake up signal comprising the network data indicator. A wireless device receiving the wake up signal from the radio network node is notified that the radio network node indicates one or more data transfer occasions. In one or more example methods, the wake up signal may target a wake up signaling group only for the wireless devices listening for corresponding system information updates. It can further be noted that the usage of a paging for notifying system information updates can enable load balancing by design, since the disclosed radio network node may be configured to, according to distributed paging occasions, not page all the wireless devices at the same time.

In one or more example methods, the method 100 comprises transmitting S102 a device data indicator indicating to the radio network node that non-real time data is expected by the wireless device. For example, transmitting S102 the device data indicator indicates that non-real time data is expected to be transmitted by the wireless device. The wireless device may initiate the process by notifying the radio network node of the wireless device's need in transmitting a large amount of data. The device data indicator can be sent when the wireless device is connected to the radio network node (e.g. during a smaller data transfer activity, or as a specific message sent to the radio network node within a short early data transmission indication). When the device data indicator is received by the radio network node can in turn be used by the radio network node as a trigger to activate the potential signaling of suitable data transfer occasions for large data transfer. In one or more example methods, transmitting S102 the device data indicator may be performed at lower layer on 3GPP signalling level.

In one or more example methods, the device data indicator is included in a random access message, or a Radio Resource Control, RRC, message. For example, a random access message may comprise msg 3 of Random Access Channel, RACH procedure, e.g. an early data transmission message. For example, the wireless device may, by transmitting the device data indicator, indicate its awareness and/or need to communicate (e.g. receive) a large amount of NRT data, and optionally also indicate to the radio network node the expected size of the upcoming downlink payload. The wireless device may send the device data indicator when the wireless device is engaged in other data connection e.g. as an indicator in RRC signaling, and/or the wireless device may send the device data indicator in a msg 3 transmission in case of an early data transmission.

In one or more example methods, the method 100 comprises receiving S101, from the external node over the radio network node, a notification message that indicates to the wireless device that non-real time data is to be expected for the wireless device. For example, a notification message may comprise an application-layer notification message.

Figure 3:
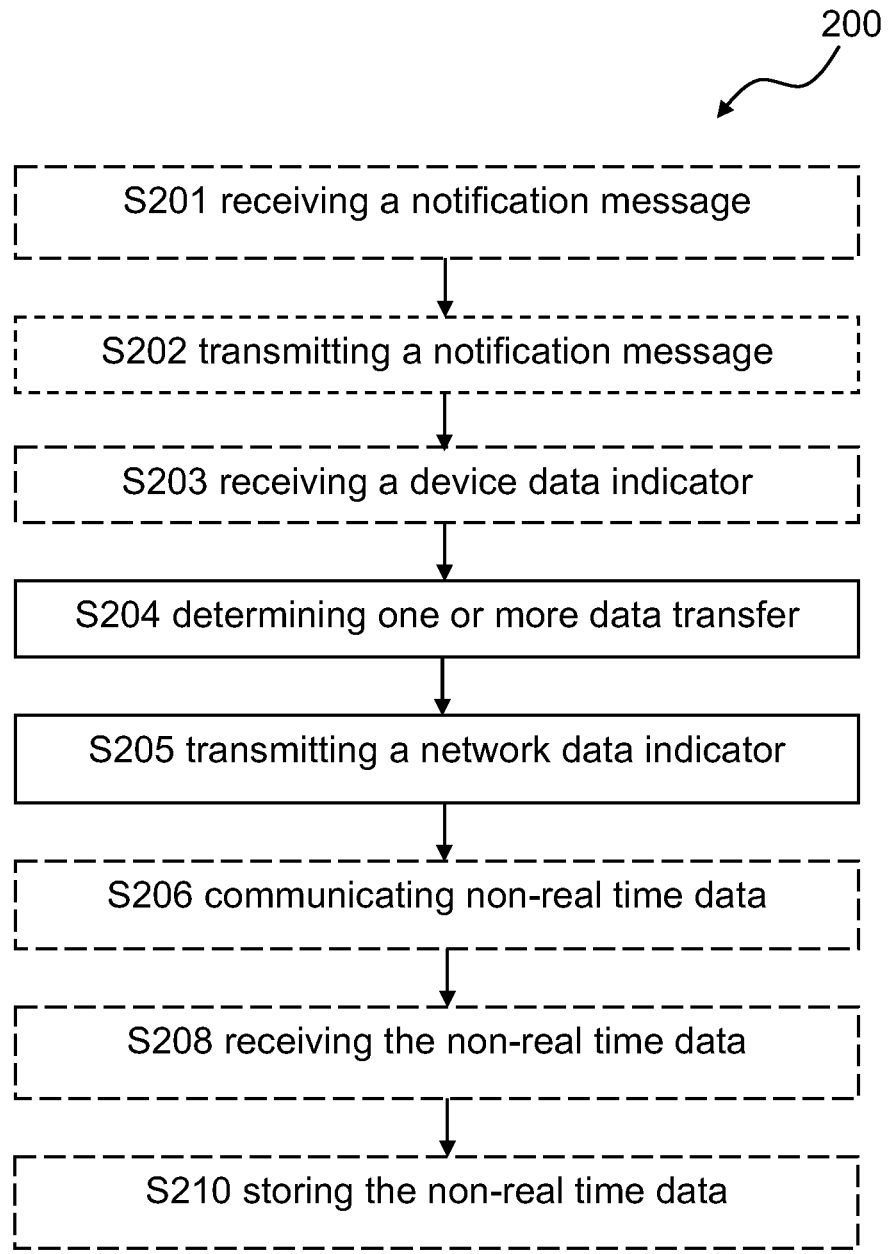
FIG. 3 is a flow-chart illustrating an exemplary method, performed in a network node of a wireless communication system, for supporting communication of non-real time data with a wireless device according to this disclosure.

FIG. 3 shows a flow diagram of a corresponding exemplary method 200 performed in a radio network node (e.g. radio network node 400 disclosed herein) according to the disclosure.

The method 200 is performed in a radio network node, for supporting communication of non-real time data with a wireless device while the wireless device is registered to the radio network node for communicating real-time data. For example, the wireless device is registered when the wireless device is camping on a cell of the radio network node, inactive, and/or idle.

The method 200 comprises determining S204 one or more data transfer occasions for communication of any non-real time data. Determining S204 the one or more data transfer occasions comprises determining one or more suitable times and/or resources for any NRT data communication.

The method 200 comprises transmitting S205 a network data indicator indicating the determined one or more data transfer occasions.

The method 200 may comprise communicating S206, to and/or from the wireless device the non-real time data at the one or more data transfer occasions. Communicating S206, to and/or from the wireless device the non-real time data at the one or more data transfer occasions may comprise communicating (e.g. transmitting and/or receiving), between the wireless device and an external node via the radio network node, the non-real time data at the one or more data transfer occasions.

In one or more example methods, the non-real time data is of a size larger than the real-time data.

In one or more example methods, the network data indicator is included in a broadcasted message, or in a dedicated message. When the network data indicator is included in a dedicated message (e.g. a dedicated signal), the network data indicator may be transmitted while the wireless device is in connected mode (e.g. RRC_Connected mode (where RRC stands for Radio Resource Control)). In one or more embodiments, the network data indicator may be transmitted to the wireless device at any of occasions assigned to real time data (e.g. real time data of a size smaller than the NRT data). It may be appreciated that the radio network node can control the occasions of large data transfers with granularity, since the control may be conducted on a UE specific level. When the network data indicator is included in a broadcasted message, the radio network node may broadcast the network data indicator e.g. in a system information, e.g. a system information block (SIB). This enables wireless devices in idle mode to be aware of the network recommendation of suitable time for large data transfers, since the wireless devices in idle mode are required to monitor the system information.

In one or more example methods, the method may comprise applying one or more methods to limit the number of simultaneous wireless devices (e.g. to load balance). One method to load balance may comprise using existing access class control (e.g. limiting the allowed wireless devices to use the function based on the International Mobile Equipment Identifier (IMEI) number of the wireless device). One method to load balance may comprise using a random access delay window for the access of the wireless device in combination with the data transfer occasion.

In one or more example methods, the network data indicator is included in a paging message, or in a wake up signal. In one or more example methods, the network data indicator is included in a paging message e.g. in a system information block, SIB, of the paging message or a specific wake up signal for wireless devices expecting a large data transfer. The wake up signal can be constructed as a separate sequence, different from the Release 15 wake up signal which is indicating an ordinary upcoming paging message to the wireless device or UE. The radio network node may transmit the wake up signal disclosed herein to indicate to the wireless device that the network status is suitable for the NRT (and possibly large) data communication. It may be noted that in legacy 3GPP specifications a system information change is notified to idle wireless devices via paging and paging information can be indicated via wake up signal in 3GPP Release 15 and onwards. For example, the disclosed method allows to indicate the suitable time for large data. It can further be noted that the usage of a paging for notifying system information updates can enable load balancing by design, since the disclosed radio network node may be configured to, according to distributed paging occasions, not page all the wireless devices at the same time.

In one or more example methods, the method 200 comprises receiving S203, from the wireless device, a device data indicator indicating to the radio network node that non-real time data is expected by the wireless device. In one or more example methods, receiving S203, from the wireless device, the device data indicator allows for the wireless device to indicate its awareness/need to receive a large amount of data, and optionally also indicate to the radio network node the expected size of the upcoming downlink payload.

In one or more example methods, the device data indicator is included in a random access message, or a Radio Resource Control, RRC, message. The radio network node may receive the device data indicator in RRC signaling, or in a msg 3 transmission in case of an early data transmission.

In one or more example methods, the device data indicator is indicative of the size of the non-real time data.

In one or more example methods, determining S204 one or more data transfer occasions for communication of the non-real time data is performed based on the size of the non-real time data indicated by the device data indicator.

For example, determining S204 one or more data transfer occasions for communication of the non-real time data is performed based on a network controlled configuration of a relative data size compared to the historical data statistics of the wireless device. This may be implemented so that the system uses the large data transfer method in case there is a need to transmit data a factor X larger than earlier sliding window average. The value of X can be configured by the radio network node as a broadcasted or UE specific value.

For example, determining S204 one or more data transfer occasions for communication of the non-real time data is performed based on a data threshold value defined by the radio network node. This may be configured by a broadcasted system information from the radio network node, or may be a UE specific configured value. For example, predetermined value or signaled/configured value of maximum amount of data and/or a timer may be used to limit the communication that can follow the transmission of the device data indicator. This may enable the radio network node to put constraints on the data size and time window of connecting with the network as a result of the device data indicator transmission.

For example, the network can allow different maximum amount of data to be communicated per UE at different times of the day.

In one or more example methods, the method comprises receiving, from the external node, S201 a notification message indicative of non-real time data to be transmitted to the wireless device. For example, the notification message may act as server data indicator to indicate to the radio network node that a new firmware is available for download by the wireless device.

In one or more example methods, the method 200 comprises transmitting S202 a notification message that indicates to the wireless device that non-real time data is to be expected for the wireless device. For example, the notification message at the application layer may indicate to the wireless device that a new firmware is available for download.

In one or more example methods, the method 200 further comprises receiving S208 from the external node the non-real time data to be transmitted to the wireless device. In one or more example methods, the method 200 further comprises storing S210 the non-real time data until transmission on the one or more data transfer occasions.

In one or more example methods, the real time data is continually or repetitively communicated over the radio network node.

Figure 4:
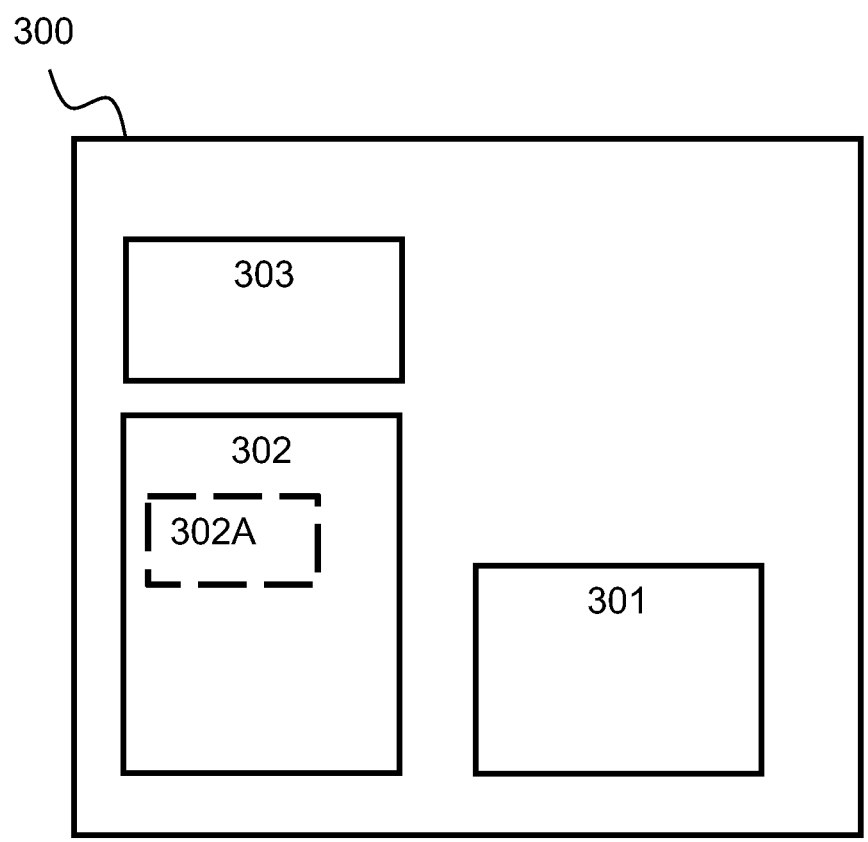
FIG. 4 is a block diagram illustrating an exemplary wireless device according to this disclosure.

FIG. 4 shows a block diagram of an exemplary wireless device 300 according to the disclosure. The wireless device 300 comprises a memory module 301, a processor module 302, and a wireless interface 303. The wireless device 300 may be configured to perform any of the methods disclosed in FIG. 2.

The wireless interface 303 is configured to communicate with a radio network node, such as the radio network node disclosed herein, using a wireless communication system. The wireless interface 303 is configured for wireless communications via a wireless communication system, such as a 3GPP system, such as a 3GPP system supporting machine type communications.

The wireless device 300 is configured to perform any of the methods disclosed herein.

The wireless module 300 is configured to communicate with an external node 600 e.g. a server device via the radio network node using wireless communications systems such as cellular systems (e.g. Narrowband IoT, e.g. low cost Narrowband IoT or category M).

The wireless interface 303 is configured to receive a network data indicator indicative of one or more data transfer occasions to communicate the non-real time data over the radio network node.

The wireless module 300 is configured to determine, e.g. via the processor module 302 (e.g. via a determiner module 302A) based on the network data indicator whether the non-real time data is to be communicated.

The wireless module 300 is configured to, e.g. via the processor module 302 and the wireless interface 303, upon determining that the non-real time data is to be communicated, to communicate the non-real time data over the radio network node to an external node at the one or more data transfer occasions.

The processor module 302 is optionally configured to perform any of the operations disclosed in FIG. 2 (S101, S102, S107). The operations of the wireless device 300 may be embodied in the form of executable logic routines (e.g., lines of code, software programs, etc.) that are stored on a non-transitory computer readable medium (e.g., the memory module 301) and are executed by the processor module 302).

Furthermore, the operations of the wireless device 300 may be considered a method that the wireless device is configured to carry out. Also, while the described functions and operations may be implemented in software, such functionality may as well be carried out via dedicated hardware or firmware, or some combination of hardware, firmware and/or software.

The memory module 301 may be one or more of a buffer, a flash memory, a hard drive, a removable media, a volatile memory, a non-volatile memory, a random access memory (RAM), or other suitable device. In a typical arrangement, the memory module 301 may include a non-volatile memory for long term data storage and a volatile memory that functions as system memory for the processor module 302. The memory module 301 may exchange data with the processor module 302 over a data bus. Control lines and an address bus between the memory module 301 and the processor module 302 also may be present (not shown in FIG. 4). The memory module 301 is considered a non-transitory computer readable medium.

Figure 5:
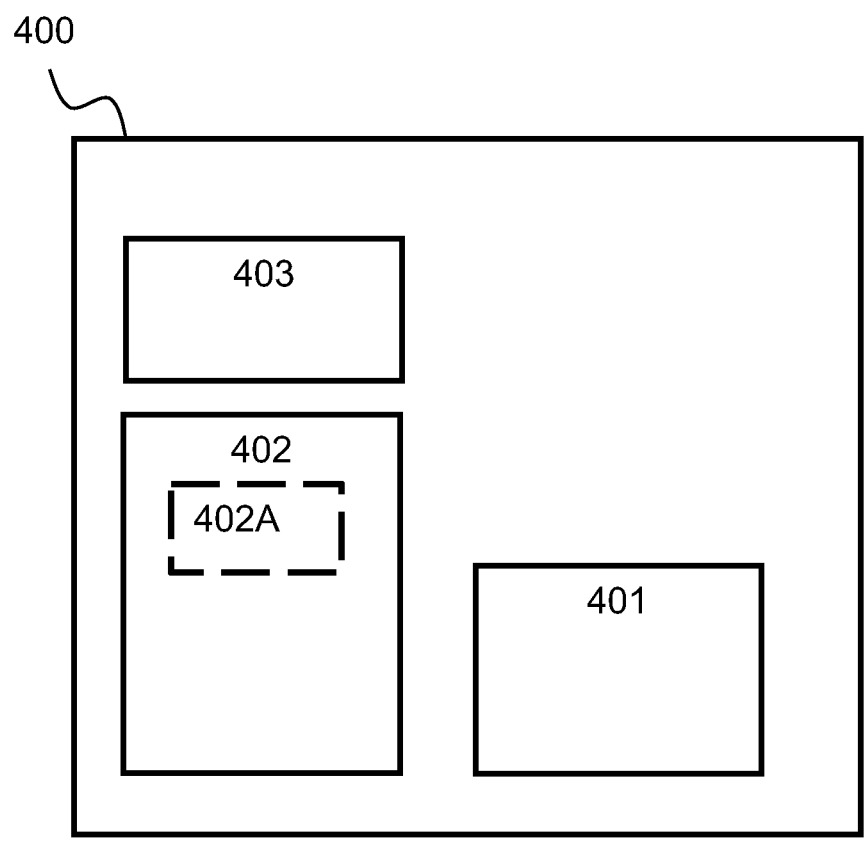
FIG. 5 is a block diagram illustrating an exemplary network node according to this disclosure.

FIG. 5 shows a block diagram of an exemplary radio network node 400 according to the disclosure.

The present disclosure relates to a radio network node 400 comprising a memory module 401, a processor module 402, and a wireless interface 401. In one or more example methods, the radio network node 400 is configured to perform any of the methods disclosed herein (e.g. disclosed in FIG. 3).

The wireless interface 403 is configured to communicate with one or more wireless device disclosed herein, using a wireless communication system. The wireless interface 403 is configured for wireless communications via a wireless communication system, such as a 3GPP system, such as a 3GPP system supporting machine type communications.

The radio network node 400 is configured to communicate with an external node e.g. a server device.

The radio network node 400 is configured to determine, e.g. via the processor module 402 (e.g. via a determiner module 402A) one or more data transfer occasions for communication of the non-real time data.

The wireless interface 403 is configured to transmitting to the wireless device a network data indicator indicating the determined one or more data transfer occasions, and The wireless interface 403 may be configured to communicate to and/or from the wireless device the non-real time data at the one or more data transfer occasions.

The processor module 402 is optionally configured to perform any of the operations disclosed in FIG. 3 (S201, S202, S203, S206, S208, S210). The operations of the radio network node 400 may be embodied in the form of executable logic routines (e.g., lines of code, software programs, etc.) that are stored on a non-transitory computer readable medium (e.g., the memory module 401) and are executed by the processor module 402).

Furthermore, the operations of the radio network node 400 may be considered a method that the wireless device is configured to carry out. Also, while the described functions and operations may be implemented in software, such functionality may as well be carried out via dedicated hardware or firmware, or some combination of hardware, firmware and/or software.

The memory module 401 may be one or more of a buffer, a flash memory, a hard drive, a removable media, a volatile memory, a non-volatile memory, a random access memory (RAM), or other suitable device. In a typical arrangement, the memory module 401 may include a non-volatile memory for long term data storage and a volatile memory that functions as system memory for the processor module 402. The memory module 401 may exchange data with the processor module 402 over a data bus. Control lines and an address bus between the memory module 401 and the processor module 402 also may be present (not shown in FIG. 5). The memory module 401 is considered a non-transitory computer readable medium.

Figure 6:
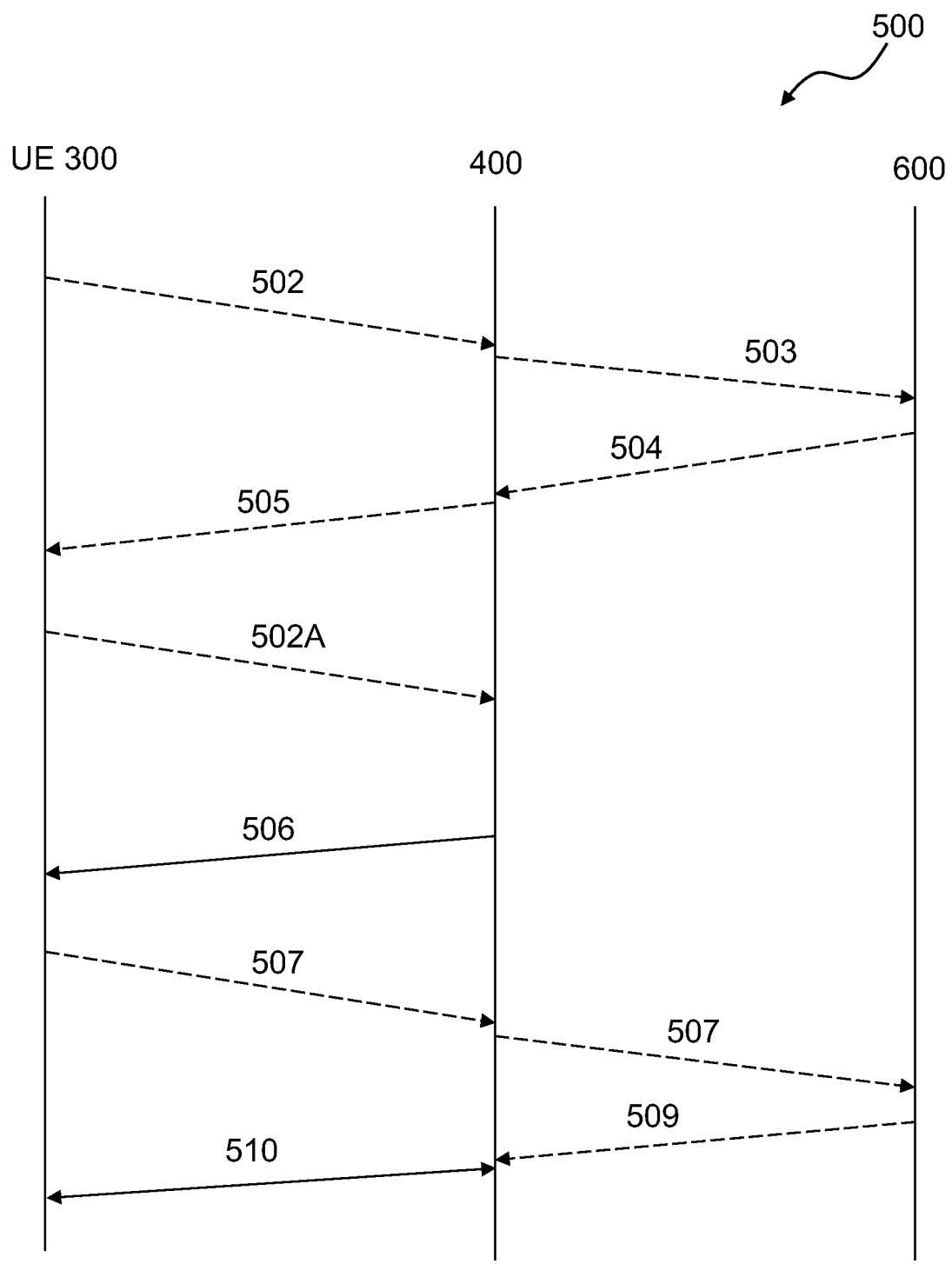
FIG. 6 is a signalling diagram between an exemplary wireless device and an exemplary radio network node according to this disclosure.

FIG. 6 is a signalling diagram 500 between an exemplary wireless device 300 and an exemplary radio network node 400 according to this disclosure.

The wireless device or UE 300 may be configured to transmit to the radio network node 400 real time (RT) data in uplink (UL) data message 502. For example, the RT data may comprise one or more intermittent status reports with small amount of data with a first connection periodicity. The radio network node 400 may be configured to transmit to an external node 600 the RT data in message 503. Optionally, the external network node 600 may be configured to transmit to the UE 300 via the radio network node 400 a Notification message 504 to indicate the availability of NRT data for the wireless device 300. In addition, UE 300 may be configured to receive in DL data 505 the Notification message indicating to the UE that non-real time data is to be expected for the UE. The Notification message in the DL data 505 may be triggered by the radio network node 400 receiving a server notification message 504 (e.g. a firmware update notification) from an external node 600. The Notification message in DL data 505 may for example indicate that a new firmware is available for the UE 300. The Notification message 504 is an application-layer message.

The radio network node 400 determines one or more data transfer occasions for communication of the non-real time data (e.g. the new firmware) and transmits a network data indicator 506 indicating the determined one or more data transfer occasions to the UE 300.

NRT data 510 is communicated between the UE 300 and the external node 600 via the radio network node 400.

When the UE 300 transmits in UL a non-real time NRT data request 507 to the external node 600 via the radio network node 400, the external node 600 may revert with the NRT data 509 (e.g. the new firmware) to the radio network node 400. For example, the radio network node 400 transmits the NRT data 510 (e.g. the new firmware) in DL to the UE 300 at the determined one or more data transfer occasions indicated in the network data indicator. As the NRT data is not real-time critical, and the UE 300 can therefore wait until there is a suitable network load condition to transfer the NRT data from the radio network node 400 to the UE 300.

When the UE 300 transmits a device data indicator 502A to the radio network node 400, the radio network node 400 receives the NRT data 510 in UL data from the UE 300 at the determined one or more data transfer occasions indicated in the network data indicator.

The network data indicator 506 disclosed herein allows to indicate the suitable occasion for the communication of the NRT data.

Figure 7A:
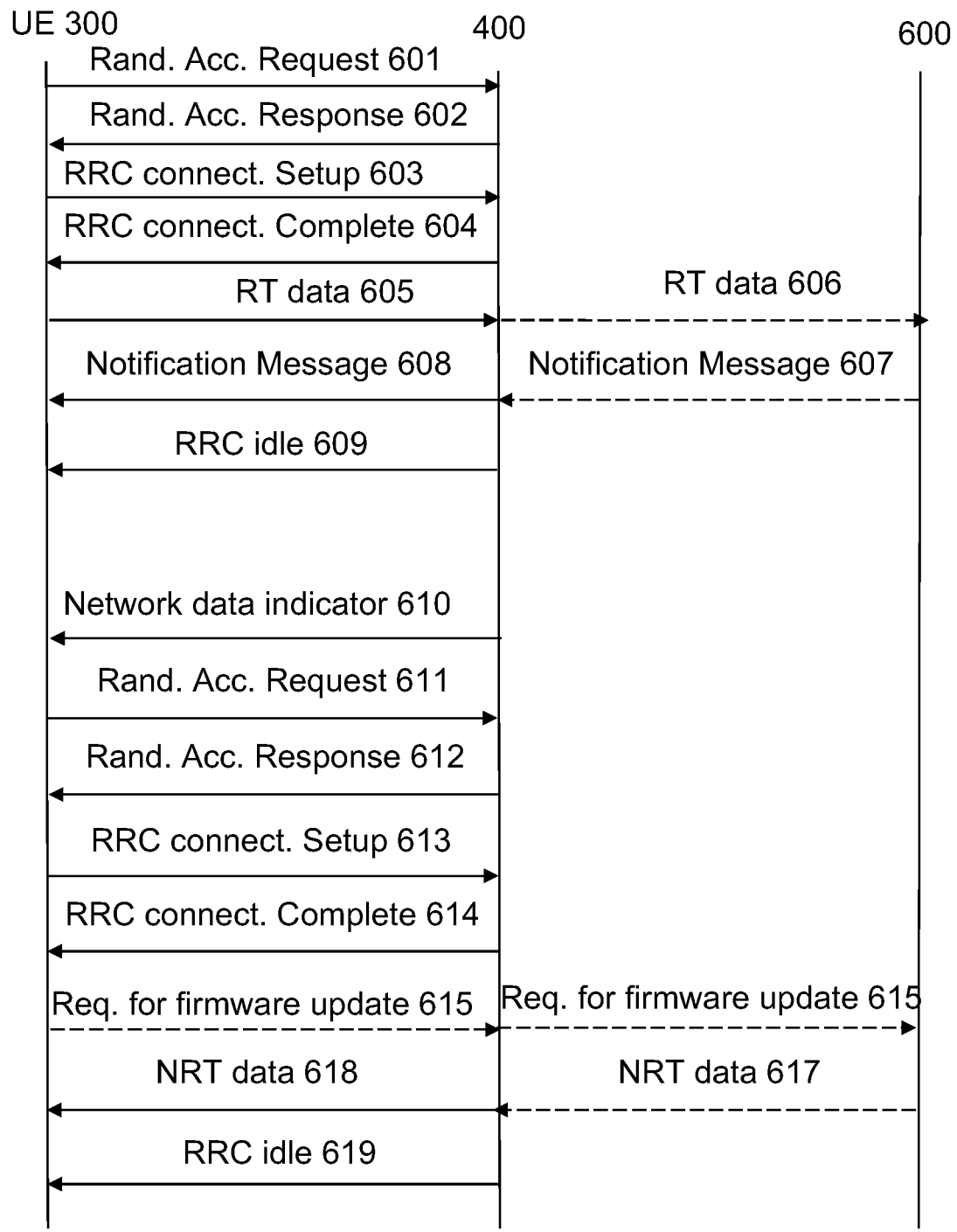
FIGS. 7A-7B are signalling diagrams between an exemplary wireless device and an exemplary radio network node according to this disclosure.
Figure 7B:
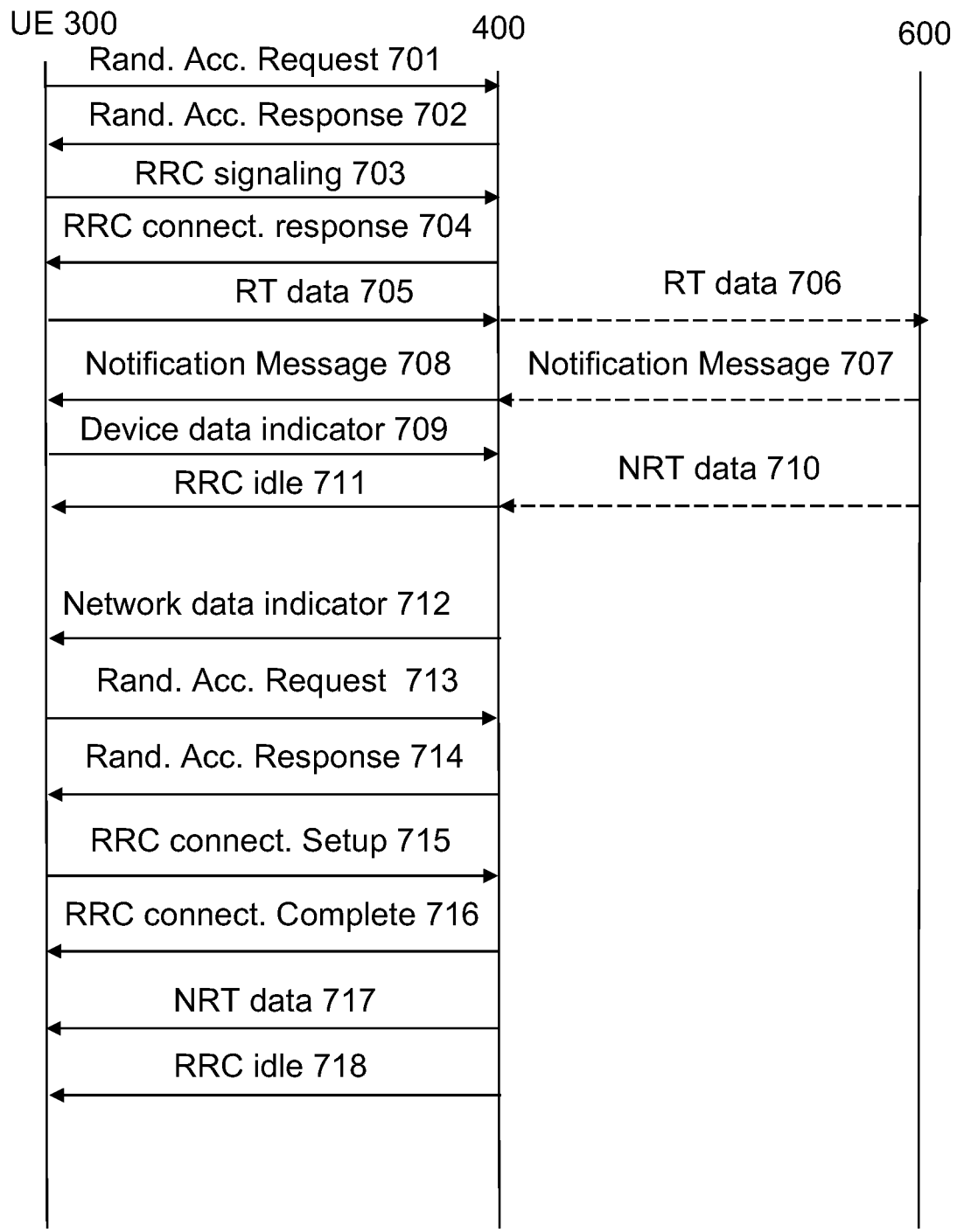

FIGS. 7A-7B are signalling diagrams between an exemplary wireless device 300 and an exemplary radio network node 400 according to this disclosure. FIGS. 7A-7B are simplified signalling diagrams which do not illustrate scheduling, data transfer and ack/nack signalling occurring in both directions for each transmission.

In FIG. 7A, the wireless device or UE 300 initiates a random access procedure with the radio network node 400 by transmitting a Random Access Request 601 and receives a Random Access Response 602 from the radio network node 400. The UE 300 and the radio network node 400 perform an RRC connection setup 603 including RRC connection complete 604. The UE 300 transmits RT data 605, 606 to an external node 600, e.g. an application server, via the radio network node 400.

The UE 300 receives a notification message 608, 607 from the external node 600 via the radio network node 400. The UE 300 may transmit a device data indicator to the radio network node 400.

The radio network node 400 puts the UE 300 in idle mode, RRC Idle 603 and determines a data transfer occasion for the communication of the NRT data based on e.g. a size of the NRT data indicated in the Notification message 607 and the network conditions.

The radio network node 400 sends a network data indicator 610 to the UE 300 to indicate the one or more data transfer occasions determined.

To prepare for the data transfer occasion, the UE 300 initiates the random access procedure (by transmitting a Random Access Request 611 and receiving a Random Access Response 612 from the radio network node 400) and performs the RRC connection setup 613, and RRC connection complete 614 with the radio network node 400.

The UE 300 may send a request for firmware update 615 to the external node 600 via the radio network node 400.

The radio network node 400 receives the NRT data 617 from the external node 600.

The UE 300 receives the new firmware as NRT data 618 at the indicated data transfer occasions. The radio network node 400 sends the UE 300 to idle mode, RRC idle 619.

In FIG. 7B, the wireless device or UE 300 initiates a random access procedure with the radio network node 400 by transmitting a Random Access Request 701 and receives a Random Access Response 702 from the radio network node 400. The UE 300 and the radio network node 400 perform an RRC connection setup including RRC signaling 703 and RRC connection complete 704. The UE 300 transmits RT data 705, 706 to an external node 600, e.g. an application server, via the radio network node 400.

The UE 300 receives a notification message 708, 707 from the external node 600 via the radio network node 400. The UE 300 transmits a device data indicator 709 to the radio network node 400.

The radio network node 400 may receive already the NRT data 710 from the external node 600 and stores it for later transmittal.

The radio network node 400 puts the UE 300 in idle mode, RRC Idle 711 and determines a data transfer occasion for the communication of the NRT data based on e.g. a size of the NRT data indicated in the Notification message 707 or a size of the NRT data received 710 and the network conditions.

The radio network node 400 sends a network data indicator 712 to the UE 300 to indicate the one or more data transfer occasions determined.

To prepare for the data transfer occasion, the UE 300 initiates the random access procedure (by transmitting a Random Access Request 713 and receiving a Random Access Response 714 from the radio network node 400) and the RRC connection setup (by sending 715, and receiving RRC connection complete 716) with the radio network node 400.

The UE 300 receives the NRT data 717 at the indicated data transfer occasions. The radio network node 400 sends the UE 300 to idle mode, RRC idle 718.

Embodiments of methods and products (radio network node and wireless device) according to the disclosure are set out in the following items:

1. A method, performed in a wireless device, for enabling controlled communication of non-real time data while the wireless device is registered with a radio network node (e.g. for communicating real-time data), the method comprising:
   receiving (S104) a network data indicator indicative of one or more data transfer occasions to communicate the non-real time data over the radio network node,
   determining (S105) based on the network data indicator whether any non-real time data is to be communicated in the one or more transfer data occasions, and
   upon determining that the non-real time data is to be communicated, communicating (S106) non-real time data over the radio network node to an external node at the one or more data transfer occasions.

2. The method according to item 1, wherein the non-real time data is of a size larger than the real-time data.

3. The method according to any of the previous items, wherein the network data indicator is included in a broadcasted message, or a dedicated message.

4. The method according to any of the previous items, wherein the network data indicator is included in a paging message, or in a wake up signal.

5. The method according to any of the previous items, the method comprising transmitting (S102) a device data indicator indicating to the radio network node that non-real time data is expected by the wireless device.

6. The method according to item 5, wherein the device data indicator is included in a random access message, or a Radio Resource Control, RRC, message.

7. The method according to any of the previous items, the method comprising receiving (S101), from the external node over the radio network node, a notification message that indicates to the wireless device that non-real time data is to be expected for the wireless device.

8. The method according to any of the previous items, wherein the one or more data transfer occasions comprise one or more suitable time for communicating the non-real time data.

9. The method according to any of the previous items, wherein the real time data is repetitively or continually communicated between the wireless device and to the external device, over the radio network node.

10. A method, performed in a radio network node, for supporting communication of non-real time data with a wireless device while the wireless device is registered to the radio network node, the method comprising:
    determining (S204) one or more data transfer occasions for communication of non-real time data;
    transmitting (S205) to the wireless device a network data indicator indicating the determined one or more data transfer occasions, and 11. The method according to item 10, the method comprising communicating (S206) non-real time data, to and/or from the wireless device, at the one or more data transfer occasions.

12. The method according to any of items 10-11, wherein the non-real time data is of a size larger than the real-time data.

13. The method according to any of items 10-12, wherein the network data indicator is included in a broadcasted message, or in a dedicated message.

14. The method according to any of items 10-13, wherein the network data indicator is included in a paging message, or in a wake up signal.

15. The method according to any of items 10-14, the method comprising receiving (S203), from the wireless device, a device data indicator indicating to the radio network node that non-real time data is expected by the wireless device.

16. The method according to item 15 wherein the device data indicator is included in a random access message, or a Radio Resource Control, RRC, message.

17. The method according to any of items 15-16, wherein the device data indicator is indicative of the size of the non-real time data, and
    wherein determining (S204) one or more data transfer occasions for communication of the non-real time data is performed based on the size of the non-real time data indicated by the device data indicator.

18. The method according to any of items 10-17, the method comprising receiving (S201) a notification message indicative of non-real time data to be transmitted to the wireless device.

19. The method according to any of items 10-18, the method comprising transmitting (S202) a notification message that indicates to the wireless device that non-real time data is to be expected for the wireless device.

20. The method according to any of items 10-19, the method further comprising:
    receiving (S208) the non-real time data to be transmitted to the wireless device, and
    storing (S210) the non-real time data until transmission on the one or more data transfer occasions.

21. The method according any of items 10-20, wherein the real time data is continually or repetitively communicated over the radio network node.

22. A wireless device comprising a memory module, a processor module, and a wireless interface, wherein the wireless device is configured to perform any of the methods according to any of items 1-9.

23. A radio network node comprising a memory module, a processor module, and a wireless interface, wherein the radio network node is configured to perform any of the methods according to any of items 10-21.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-7B comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed in a wireless device supporting machine type communications, for enabling controlled communication of non-real time data while the wireless device is registered with a radio network node, the method comprising:

transmitting a device data indicator indicating to the radio network node that the non-real time data is expected by the wireless device, wherein the device data indicator is indicative of a size of the non-real time data expected by the wireless device, wherein the device data indicator is included in a Radio Resource Control (RRC) message;

receiving a network data indicator indicative of one or more data transfer occasions selected based on the indicated size of the non-real time data expected by the wireless device to communicate the non-real time data over the radio network node;

determining based on the network data indicator whether any of the non-real time data is to be communicated in the one or more data transfer occasions; and upon determining that any of the non-real time data is to be communicated, communicating while the wireless device is in an RRC idle mode the non-real time data over the radio network node between the wireless device and an external node at the one or more data transfer occasions.

2. The method according to claim 1, wherein the network data indicator is included in a broadcasted message, or a dedicated message.

3. The method according to claim 1, wherein the network data indicator is included in a paging message, or in a wake up signal.

4. The method according to claim 1, the method comprising receiving, from the external node over the radio network node, a notification message that indicates to the wireless device that non-real time data is to be expected for the wireless device.

5. The method according to claim 1, wherein the one or more data transfer occasions comprise one or more suitable time for communicating the non-real time data.

6. The method according to claim 1, wherein the real time data is repetitively or continually communicated between the wireless device and to the external device, over the radio network node.

7. The method according to claim 1, wherein the network data indicator is included in one or more of:
   a broadcasted message;
   a dedicated message;
   a paging message; and/or
   a wake up signal.

8. A method, performed in a radio network node, for supporting controlled machine type communication of non-real time data with a wireless device while the wireless device is registered to the radio network node, the method comprising:

receiving, from the wireless device, a device data indicator included in a Radio Resource Control (RRC) message, the device data indicator indicating that the non-real time data is expected by the wireless device, wherein the device data indicator is indicative of a size of the non-real time data expected by the wireless device;

determining based on the indicated size of the non-real time data expected by the wireless device one or more data transfer occasions for communication of the non-real time data;

transmitting to the wireless device a network data indicator indicating the determined one or more data transfer occasions; and communicating the non-real time data, between the radio network node and the wireless device while the wireless device is in an RRC idle mode, at the one or more data transfer occasions.

9. The method according to claim 8, wherein the network data indicator is included in a broadcasted message, or in a dedicated message.

10. The method according to claim 8, wherein the network data indicator is included in a paging message, or in a wake up signal.

11. The method according to claim 8, wherein:
the device data indicator is indicative of the size of the non-real time data; and
the determining the one or more data transfer occasions for the communication of the non-real time data is performed based on the size of the non-real time data indicated by the device data indicator.

12. The method according to claim 8, further comprising receiving a notification message indicative of the non-real time data to be transmitted to the wireless device.

13. The method according to claim 8, further comprising transmitting a notification message that indicates to the wireless device that the non-real time data is to be expected for the wireless device.

14. The method according to claim 8, further comprising:
receiving the non-real time data to be transmitted to the wireless device; and
storing the non-real time data until transmission on the one or more data transfer occasions.

15. The method according to claim 8, wherein the transmitting the network data indicator comprises transmitting the network data indicator included in one or more of:
a broadcasted message;
a dedicated message;
a paging message; and/or
a wake up signal.

16. A method, performed in a wireless device supporting machine type communications, for enabling controlled communication of non-real time data while the wireless device is registered with a radio network node, the method comprising:
transmitting a device data indicator included in a Radio Resource Control (RRC) message to the radio network node, the device data indicator indicating that the non-real time data is expected by the wireless device;
receiving a network data indicator indicative of one or more data transfer occasions to communicate the expected non-real time data over the radio network node;
determining based on the network data indicator whether any of the non-real time data is to be communicated in the one or more data transfer occasions; and
upon determining that any of the non-real time data is to be communicated, communicating while the wireless device is in an RRC idle mode the non-real time data over the radio network node to one or more of the radio network node and/or an external node at the one or more data transfer occasions.

17. The method according to claim 16, further comprising:
repetitively or continually communicating, while the wireless device is in the RRC idle mode, the non-real time data over the radio network node to the one or more of the radio network node and/or the external node.

18. The method according to claim 16, wherein the network data indicator is included in one or more of:
a broadcasted message;
a dedicated message;
a paging message; and/or
a wake up signal.

19. The method according to claim 16, wherein the one or more data transfer occasions comprise one or more suitable times for communicating the non-real time data while the wireless device is in an RRC idle mode.

20. A method, performed in a radio network node, for supporting controlled machine type communication of non-real time data with a wireless device while the wireless device is registered to the radio network node, the method comprising:
receiving, from the wireless device, a device data indicator included in a Radio Resource Control (RRC) message, the device data indicator indicating that the non-real time data is expected by the wireless device;
determining one or more data transfer occasions for communication of the non- real time data;
transmitting to the wireless device a network data indicator indicating the determined one or more data transfer occasions; and
communicating the non-real time data, between the radio network node and the wireless device while the wireless device is in an RRC idle mode, at the one or more data transfer occasions.

21. The method according to claim 20, wherein the transmitting the network data indicator comprises transmitting the network data indicator included in one or more of:
a broadcasted message;
a dedicated message;
a paging message; and/or
a wake up signal.

22. The method according to claim 20, further comprising receiving a notification message indicative of the non-real time data to be transmitted to the wireless device.

23. The method according to claim 20, further comprising transmitting a notification message that indicates to the wireless device that the non-real time data is to be expected for the wireless device.

24. The method according to claim 20, further comprising:
receiving the non-real time data to be transmitted to the wireless device; and
storing the non-real time data until transmission on the one or more data transfer occasions.

* * * * *